United States Patent

[11] 3,591,202

[72] Inventors Harold H. Larsen
 Long Beach;
 Robert E. Oehring, Norwalk, both of, Calif.
[21] Appl. No. 847,039
[22] Filed Aug. 4, 1969
[45] Patented July 6, 1971
[73] Assignee Bates Industries, Inc.
 Long Beach, Calif.

[54] MOTORCYCLE RIDEOFF STAND
 4 Claims, 6 Drawing Figs.
[52] U.S. Cl. ........................................... 280/303
[51] Int. Cl. ........................................... B62h 1/02
[50] Field of Search .................................. 280/303, 301, 302, 293

[56] References Cited
 UNITED STATES PATENTS
 2,672,352 3/1954 Shobe ........................... 280/301
 3,362,726 1/1968 Bell .............................. 280/303

FOREIGN PATENTS
 498,966 11/1954 Italy ............................. 280/303

Primary Examiner—Kenneth H. Betts
Attorney—Fulwider, Patton, Rieber, Lee and Utecht ABSTRACT: A motorcycle stand having an elongated support sleeve for fixed securement to a motorcycle frame. A pair of ground engaging legs are pivotally carried within the opposite open ends of the sleeve and receive stop pins which slidably travel within arcuate slots in the support sleeve. The pins hold the parts together while allowing the legs to move in the sleeve between their retracted and their ground engaging positions. The legs are each pinned to a central coupling within the sleeve for common pivotal movement. A pair of torsion springs are located within the sleeve, disposed about the legs, and are each secured at one end to an associated leg. The other ends of the springs are anchored to elements secured to and projecting through the sleeve so that the springs are operative to bias the legs rearwardly and upwardly to retracted position once the motorcycle is driven forwardly and off the stand.

PATENTED JUL 6 1971

3,591,202

INVENTORS.
HAROLD H. LARSEN
ROBERT E. OEHRING
BY Fulwider, Patton, Rieber,
Lee and Utecht
ATTORNEYS 3,591,202

1

MOTORCYCLE RIDEOFF STAND

BACKGROUND OF THE INVENTION

1. Field of the Invention

The present invention relates to a motorcycle stand and particularly a motorcycle stand for supporting a motorcycle with its drive wheel in ground engaging position so that the motorcycle can be driven off the stand.

2. Description of the Prior Art

The self-retracting motorcycle rideoff stands of the prior art are relatively expensive to fabricate and assemble. Typical of these stands is that which is disclosed in U.S. Pat. No. 2,791,441. This type of stand includes a considerable number of components which must be specially made, and its assembly is such that the retracting spring and operatively interengageable parts are exposed to possible entanglement with the rider.

SUMMARY OF THE INVENTION

The motorcycle rideoff stand of the present invention comprises components which are for the most part concealed within an elongated sleeve which is adapted to be fixed to the motorcycle frame. The sleeve is open ended to pivotally receive the inner extremities of a pair of legs whose opposite extremities are engageable with the ground to support the motorcycle. A coupling located internally of the sleeve connects the legs for common pivotal movement, and stop means are provided to limit relative movement between the legs and the sleeve to thereby establish the retracted and ground engaging positions of the legs. Torsion spring means are also located internally of the sleeve and act to bias the legs toward their retracted positions. The majority of the components of the stand are located internally of the sleeve and, as will be seen, standard pipe and tubing can be used for various components, with simple pins or the like being used for assembly.

Other objects and features of the present invention will become apparent from a consideration of the following detailed description when taken in conjunction with the accompanying drawing.

DESCRIPTION OF THE PREFERRED EMBODIMENT

Figure 1:
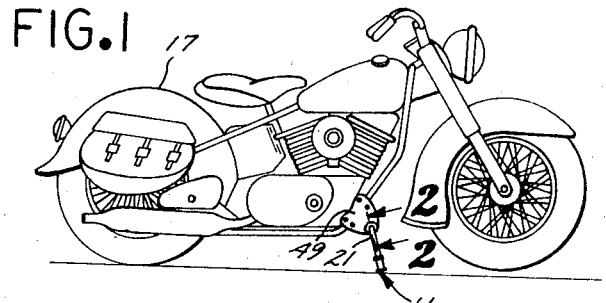
FIG. 1 is a side elevational view of a motorcycle provided with a rideoff stand according to the present invention.

Referring now to the drawing, there is illustrated a motorcycle rideoff stand 11 according to the present invention, and which is shown mounted to a motorcycle 17. The stand 11 includes an elongated, horizontally oriented, and open ended sleeve 15 fixedly secured to the frame of the motorcycle 17. Telescoped into the opposite open ends of the sleeve 11 are the inner extremities or journal portions 19 and 20 of a pair of ground engaging legs 21 and 23 which are pivotable in the sleeve 15 between retracted positions, as shown in full lines in FIG. 3, and ground engaging positions, as shown in FIG. 1.

A central coupling 27 is rotatably telescoped within the sleeve 15 and is telescoped at its ends over the inner extremities or journal portions 19 and 20 of the legs 21 and 23, respectively. One end of the coupling 27 includes transversely aligned openings 31 which are in registry with a complemental pair of transverse openings 33 provided in the sleeve 15. The openings 31 and 33 are, in turn, in registry with a transverse opening 35 provided in the inner extremity of the journal portion 19 of the leg 21. The journal portion 19 is secured to the coupling 27 by a pin 45 inserted into the openings 31 and 35.

The other end of the coupling 27 includes similar transversely aligned openings 61 in registry with a transverse opening 63 provided in the inner extremity of the journal portion 20 of the leg 23. As will be seen, leg 23 is assembled to coupling 27 by inserting the inner extremity of the leg 23 into the coupling 27 until the openings 61 and 63 are aligned. A coupling pin 65 is then driven into the openings 61 and 63. Assembly of both legs 21 and 23 to the coupling 27 provides for their common rotation within the sleeve 15.

A pair of coil springs 39 and 41 are disposed about the journal portions 19 and 20 and, as will be seen, bias the legs 21 and 23 rearwardly and upwardly to their retracted positions.

Figure 3:
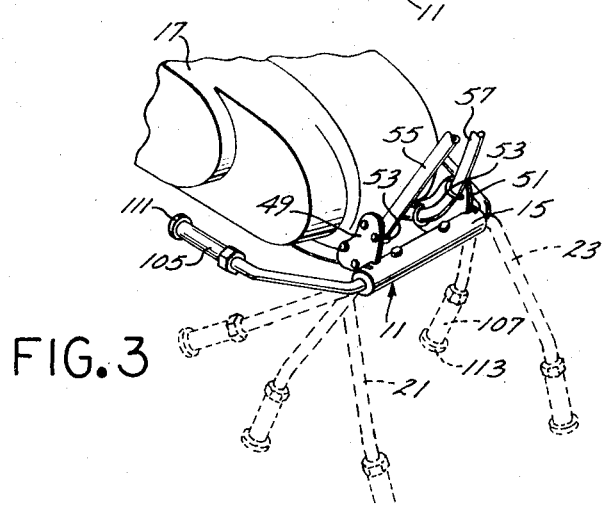
FIG. 3 is a perspective view, in enlarged scale, of the stand shown in FIG. 1.
Figure 4:
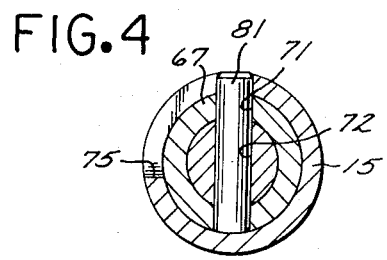
FIG. 4 is an enlarged view taken along the line 4-4 of FIG. 2.
Figure 5:
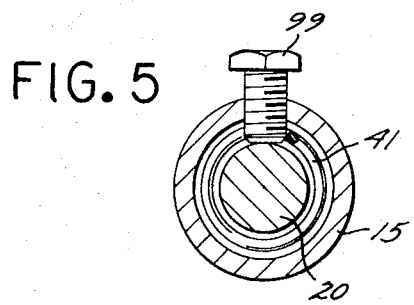
FIG. 5 is an enlarged view taken along the line 5-5 of FIG. 2.

The sleeve 15 is conveniently made of a length of conventional and inexpensive pipe. As best seen in FIG. 3, rearwardly and inwardly angled mounting brackets 49 and 51 are welded to the sleeve 15, and include bores to receive a plurality of U-bolts 53 which extend around and clamp upon usual frame members 55 and 57 of the motorcycle 17 to secure the stand 11 in operative position.

Telescoped over the outer extremities of the journal portions 19 and 20 are a pair of cylindrical bearings 67 and 69. Transverse bores 72 and 74 are provided in the bearings 67 and 69, respectively, for registry with transverse openings 72 and 74 in the journal portions 19 and 20. A pair of circumferentially oriented slots 75 and 77 are formed in the sleeve 11 in registry with the openings 71 and 73, respectively. A pair of stop pins 81 and 83 are press-fitted through the bore 72 and openings 71, and through the bore 74 and openings 73, and project into the slots 75 and 77, respectively, to limit the extent of relative forward and reverse movement of such legs relative to the sleeve 15.

Figure 2:
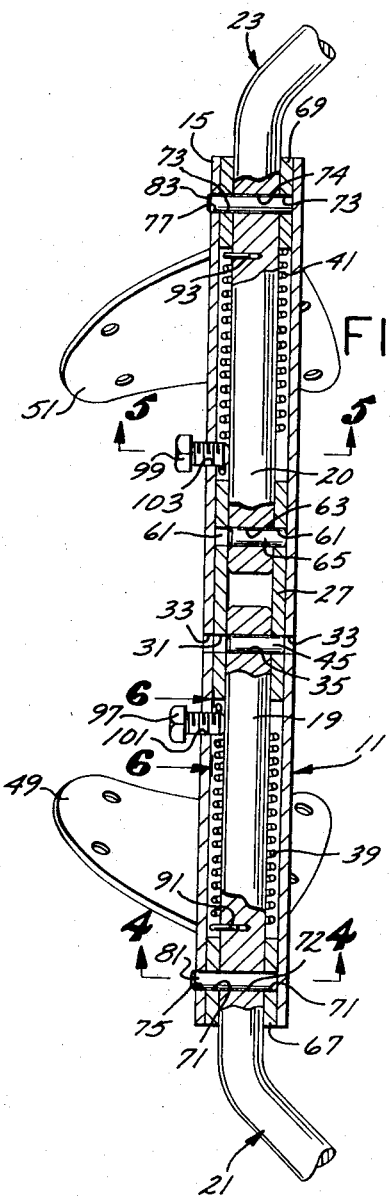
FIG. 2 is an enlarged view taken along the line 2-2 of FIG. 1.
Figure 6:
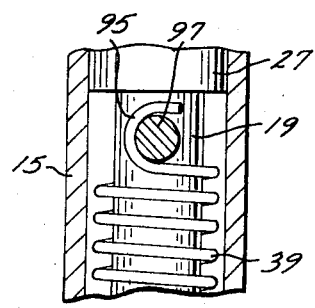
FIG. 6 is an enlarged view taken along the line 6-6 of FIG. 2.

Referring to FIG. 2, the outer extremities of the respective springs 39 and 41 include radially inwardly oriented end portions which project into transverse bores 91 and 93 provided in the journal portions 19 and 20. The inner or opposite extremities of the springs 39 and 41 include partial loops or hooks 95, as best seen in FIG. 6, which are engaged and held by the inner extremities of a pair of studs 97 and 99 which are threaded into complemental bores 101 and 103 provided in the wall of the sleeve 15.

With reference to FIG. 3, the lower extremities of the legs 21 and 23 are threaded (not shown) to threadably receive adjustment couplings 105 and 107 having ground-engaging feet 111 and 113. The couplings 105 and 107 are threadably adjusted up or down to position the front wheel of the motorcycle slightly off the ground when the legs 21 and 23 are in their ground engaging positions of FIG. 1.

The motorcycle rideoff stand of the present invention is extremely inexpensive to fabricate since major portions of it can be made from conventional pipe and rod material. Thus, the legs 21 and 23 are largely made of standard bar stock, as are the various pins, while the coupling 27, bearings 67 and 69, and sleeve 15 can be made of conventional pipe.

Assembly of the stand 11 is rapid and straight forward. The bearings 67 and 69 are first fitted into position upon the legs 21 and 23, and then the springs 39 and 41 are slipped over the journal portions 19 and 20 with the outer ends of the springs projected into the bores 91 and 93. The coupling 27 is next telescoped over the inner end of the journal portion 20, and the coupling pin 65 is inserted to secure these parts together. The journal portions 19 and 20 are then inserted into opposite ends of the sleeve 15 until the portion 19 projects into the coupling 27. The pin 45 is then driven through the openings 33 and into the openings 31 and 35 to couple the two legs 21 and 23 together. Of course, the pin 45 does not project into the openings 33.

Next, the pair of studs 97 and 99 are threaded into the hooks 95 of the torsion springs. Then, with the sleeve 15 held stationary, the legs 21 and 23 are rotated counterclockwise, as viewed in FIG. 3, to wind up the springs 39 and 41. The stop pins 81 and 83 next are inserted to hold the springs and limit their unwinding action or bias to the amount of travel of the pins 81 and 83 in the slots 75 and 77. This, of course, establishes the amount of permitted forward and rearward rotation of the legs 21 and 23 in the sleeve 15. The assembled stand 11 may then be attached by the user to his motorcycle by means of the U-bolts 53, as illustrated in FIGS. 1 and 3.

In operation of the stand 11, the legs 21 and 23 are normally biased by the springs 39 and 41 into the retracted positions shown in solid lines in FIG. 3. If the user wishes to park the motorcycle 17 on the stand 11, he simply pushes his foot against one of the legs 21 and 23 to rotate them downwardly into engagement with the ground, while simultaneously pulling the motorcycle rearwardly. This raises the front wheel of the motorcycle off the ground, with the legs of the stand 11 in an overcenter position so that the weight of the motorcycle is sufficient to resist the bias of the springs 39 and 41. The motorcycle 17 will remain in this position until it is moved forwardly. This ground engaging position of the legs 21 and 23 is established by engagement of the stop pins 75 and 77 with the ends of the sleeve slots 75 and 77.

When the user wishes to ride the motorcycle 17 off the stand 11, he simply accelerates the engine sufficiently to drive the motorcycle forward, causing the legs 21 and 23 to pivot rearwardly and upwardly, under the bias of the springs 39 and 41, to their retracted positions, as shown in solid lines in FIG. 3. The stop pins 81 and 83 engage the opposite ends of the slots 75 and 77 to establish the retracted positions of the legs 21 and 23.

From the foregoing it will be apparent that the motorcycle rideoff stand of the present invention is economical to fabricate and assemble, and that an appreciable number of its components are completely concealed from view within the sleeve 15.

Various modifications and changes may be made with regard to the foregoing detailed description without departing from the spirit of the invention.

We claim:

1. A motorcycle rideoff stand comprising:
   an elongated, open ended support sleeve for fixed securement to a motorcycle frame;
   a pair of ground engaging legs carried within the opposite open ends of said sleeve for pivotal movement between retracted and ground engaging positions;
   stop means carried by said pair of legs and said support sleeve and operative to limit the extent of relative pivotal movement between said support sleeve and said legs;
   a central coupling within said sleeve;
   means securing said central coupling to said pair of legs for common rotation of said legs within said sleeve; and
   torsion spring means located within said sleeve and about the inner extremity of at least one of said legs, and operatively connected to said sleeve and to said one of said legs to exert its bias to rotate said legs rearwardly and upwardly from said ground engaging positions to said retracted positions.

2. A motorcycle rideoff stand according to claim 1 wherein:
   said stop means includes a pair of circumferentially oriented slots in the opposite extremities of said sleeve, and further includes a pair of stop pins carried by said pair of legs, respectively, and projecting into said slots of said support sleeve.

3. A motorcycle rideoff stand as set forth in claim 2 wherein:
   said torsion spring means is disposed circumferentially about said one of said legs and is secured thereto at one extremity and includes a hook at its opposite extremity;
   said sleeve includes holding means engageable with said hook whereby said legs may be inserted into said sleeve with said spring means in its relaxed condition, said hook engaged with said holding means, said legs thereafter rotated to tighten said spring means, and said stop pins subsequently installed to limit movement of said legs relative to said sleeve.

4. A motorcycle rideoff stand as set forth in claim 1 and including cylindrical bearings disposed between said legs and the outer extremities of said sleeve to define annular spaces adjacent said bearings, and said torsion spring means comprising a pair of torsion springs disposed within said spaces.